United States Patent [19]
Kis et al.

[11] Patent Number: 5,829,932
[45] Date of Patent: Nov. 3, 1998

[54] MACHINE ALIGNMENT COMPENSATION ACTUATOR SYSTEM

[75] Inventors: Charles J. Kis, West Bend; James K. Jourdan; Paul A. Huck, both of Fond du Lac; Peter A. Beyer, Mt. Calvary, all of Wis.

[73] Assignee: Giddings & Lewis, Inc., Fond du Lac, Wis.

[21] Appl. No.: 863,727

[22] Filed: May 27, 1997

Related U.S. Application Data

[63] Continuation of Ser. No. 435,361, May 5, 1995, abandoned.

[51] Int. Cl.⁶ .................................................. B23C 1/12
[52] U.S. Cl. ........................ 409/186; 409/193; 409/238; 408/13; 408/234
[58] Field of Search .................... 408/234, 13; 409/131, 409/132, 193, 186, 238, 239

[56] References Cited

U.S. PATENT DOCUMENTS

| | | | |
|---|---|---|---|
| 3,484,064 | 12/1969 | Koenig III | 409/238 X |
| 3,484,065 | 12/1969 | Walter | 409/238 X |
| 4,440,530 | 4/1984 | Yamakage | 408/13 X |
| 4,481,742 | 11/1984 | Shimizu et al. | 51/165.8 |
| 4,712,953 | 12/1987 | Witzel et al. | 408/13 X |
| 5,214,592 | 3/1993 | Serizawa et al. | 409/238 X |
| 5,348,431 | 9/1994 | Kusunoki et al. | 409/132 |

FOREIGN PATENT DOCUMENTS

| | | |
|---|---|---|
| 3708412 A1 | 9/1988 | Germany . |
| 4-82649 | 3/1992 | Japan . |
| 6-69322 | 3/1994 | Japan . |
| 659 608 A5 | 2/1987 | Switzerland . |

OTHER PUBLICATIONS

Bryan, J.B., "Design and Construction of an Ultraprecision 84 Inch Diamond Turning Machine", Journal of American Society for Precision Engineering, Jan., 1979, 0141–6359/79/01–0013–05 IPC Business Press.

Hatamura et al., Development of an Intelligent Machining Center Incorporating Active Compensation for Thermal Distortio, *Annals of the CIRP*, vol. 42/Jan./1993, p. 549–552.

Primary Examiner—A. L. Pitts
Assistant Examiner—Henry W. H. Tsai
Attorney, Agent, or Firm—Foley & Lardner

[57] ABSTRACT

A machine alignment compensation actuator system is disclosed. The system is designed to selectively orient the tool head of a machine tool to maintain the tool along a desirable axis of alignment. The system includes a framework and a machine slide assembly configured to hold the tool. An actuator assembly having a plurality of actuators is disposed between the machine slide assembly and the framework. Each actuator is disposed at a unique location to permit selective reorientation of the machine slide assembly and tool with respect to the framework.

29 Claims, 4 Drawing Sheets

MACHINE ALIGNMENT COMPENSATION ACTUATOR SYSTEM

CROSS REFERENCE TO RELATED APPLICATION

This application is a continuation of application Ser. No. 08/435,361 filed May 5, 1995 (now abandoned), and the benefit of this earlier filing date is hereby claimed under 35 U.S.C. §120.

FIELD OF THE INVENTION

The present invention relates generally to a machine alignment compensation actuator system, and particularly to an alignment compensation actuator system that may be disposed between the tool head and the framework of a machine tool to maintain accurate alignment of the tool head.

BACKGROUND OF THE INVENTION

In many machines, such as machine tools, a tool for performing certain operations is movably attached to a rigid framework. To accurately perform certain operations, such as the cutting of a workpiece, it is often necessary to maintain the orientation of the tool as consistently as possible. However, the wearing of machine components, the force exerted against the tool by the workpiece, forces due to shifting masses, and the expansion or contraction of components due to either localized or environmental changes in temperature are examples of influences that effect the orientation or alignment of the tool. This is a particular problem in maintaining accurate alignment of the tool head and cutter in a typical machine tool.

Existing methods or systems for maintaining machine component alignment include accurate machining of guide mounting surfaces, such as ways, hand scraping of guide mounting surfaces, applying assembly fixtures and non-shrink epoxy to align guide surfaces, and incorporating redundant structural mounts into the structure to distort the overall structure in an effort to achieve the desired alignments. These alignment methods and systems, however, are permanent and cannot easily be changed once initially established. Thus, changes caused by loads or wear of components still have very undesirable effects on the alignment of the tool. This has detrimental effects on the overall performance of the machine.

Furthermore, the manufacturing costs associated with these methods can be difficult to predict. The costs tend to increase rapidly as tighter tolerances are required, due to the necessary precision with which the various machine components must be constructed. It would be advantageous to have a system that did not require such precise construction of machine components.

Other attempts have been made to alleviate the problems of alignment. In some devices, corrections in alignment of the tool are made by adjusting the machine slides or ways. In at least one device, corrections are made by deforming the machine structure via thermal expansion and contraction. The latter device uses a plurality of cooling jackets and heaters mounted about the base of the machine. Thus, different portions of the machine base may be heated or cooled to provide twisting of the structure and realignment of the tool. This approach may be problematic, because the response times are relatively long. Additionally, the alignment control works through the structure of the machine rather than acting directly against the tool head, thus complicating the correction of alignment.

It would be advantageous to provide a machine alignment compensation actuator system that acts directly against the machine tool head assembly to quickly readjust the orientation of the tool.

SUMMARY OF THE INVENTION

The present invention features a machine alignment compensation actuator system for use with a machine tool of the type that moves a tool to perform an operation on a workpiece. The actuator system is designed to maintain precise alignment of the tool and comprises a framework and a machine slide assembly configured to hold the tool along a given axis set in space. An actuator assembly is disposed between the machine slide assembly and the framework. The actuator assembly has a plurality of actuators with each actuator being disposed at a unique location. By adjusting each actuator independently, the machine slide assembly and tool can be reoriented.

According to more detailed aspects of the invention, the plurality of actuators may comprise piezoelectric ceramics. Alternatively, the actuators may comprise diaphragms cooperating with the tool holder to form cavities for receiving pressurized fluid. By selectively pressurizing the cavities, the diaphragms are forced to flex and thereby readjust the orientation of the tool holder assembly.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
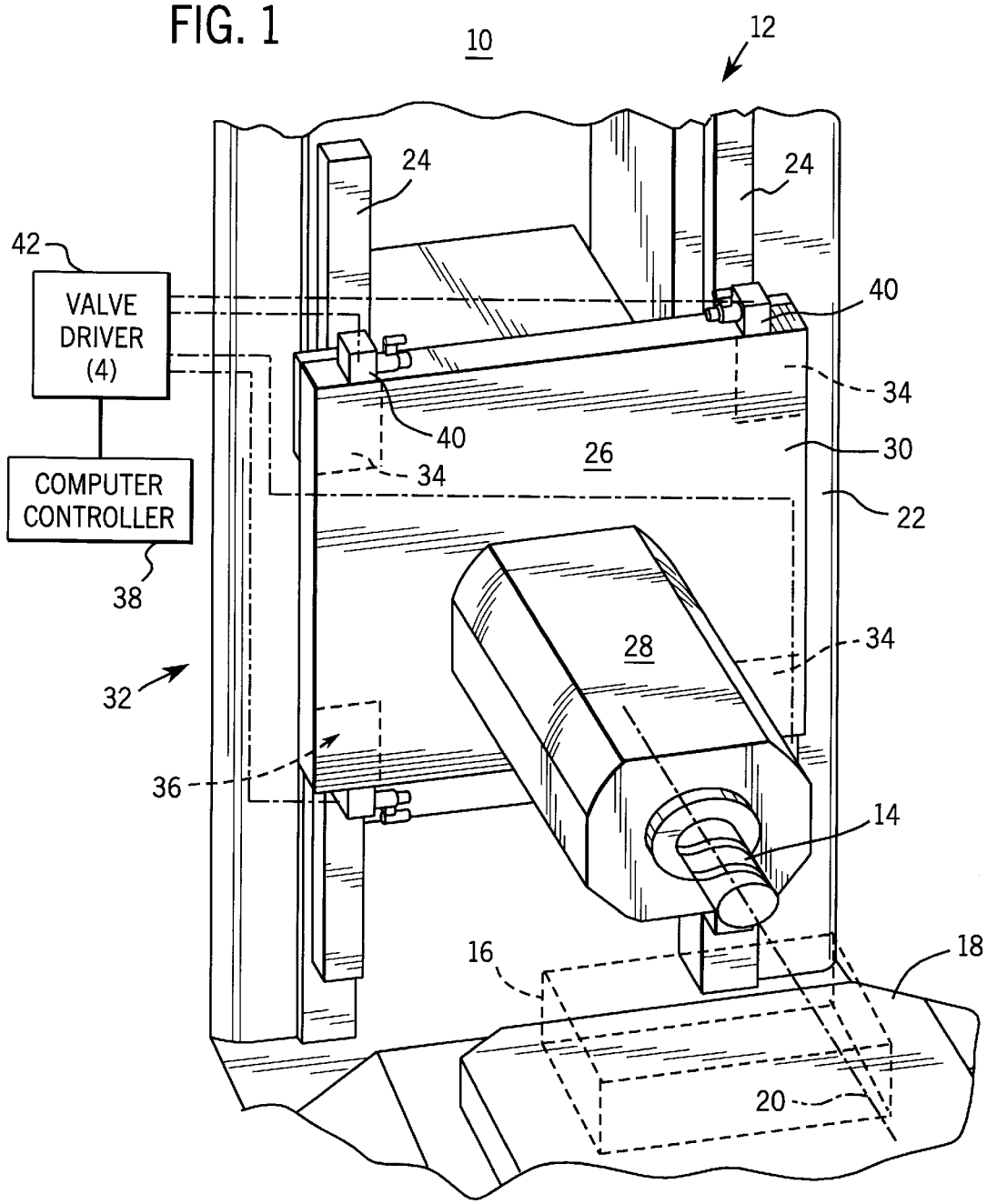
FIG. 1 is a schematic representation and perspective view of the machine alignment compensation actuator system according to a one embodiment of the invention.

Referring generally to FIG. 1, a machine tool alignment system 10, according to a preferred embodiment of the present invention, is illustrated as including a machine tool 12 of the type designed to move a tool 14 for performing an operation on a workpiece 16. In the illustrated embodiment, workpiece 16 is mounted on a workpiece pallet 18, and tool 14 is oriented along a preferred or desired axis 20 fixed in space. The illustrated tool 14 is for forming workpiece 16, but a wide variety of tools are encompassed within the scope of the present invention. For example, tool 14 may comprise shearing cutters, rotary cutters, such as end mills or drills, and probes for sensing certain parameters of workpiece 16.

Machine tool 12 includes a framework 22, and framework 22 may include at least one reference surface or way 24. Preferably, framework 22 includes a pair of ways 24.

A machine slide assembly 26 is movably mounted to framework 22, and in the illustrated embodiment, is slidably mounted along ways 24. However, machine slide assembly 26 and ways 24 could be mounted in a variety of orientations along various axes. Machine slide assembly 26 may include a tool holder 28, such as the illustrated cantilevered beam or a rotatable spindle, or machine slide assembly 26 may be configured to receive workpiece 16 or workpiece pallet 18 mounted thereon. Machine slide assembly 26 may further include a support or headstock 30 mounted to tool holder 28.

An actuator assembly 32 includes a plurality of actuators 34, each disposed between machine slide assembly 26 and framework 22, e.g., between ways 24 and support 30. Each actuator 34 is placed at a unique location and can be independently adjusted to reorient machine slide assembly 26, and thus tool 14, with respect to the desired axis 20 and workpiece 16. Actuators 34 and machine slide assembly 26 could also be connected between the framework and the workpiece 16 to adjust the workpiece with respect to axis 20 and tool 14.

Actuators 34 may be constructed in a variety of forms that are able to produce lateral movements with respect to framework 22. Exemplary actuators include piezo-electric ceramics, such as those manufactured by EDO Corporation, diaphragm assemblies 36 as illustrated in the remaining figures, or various other actuator devices.

The actuators 34 are preferably controlled by a computer numerical controller 38 of the machine tool 12 that may be programmed for adjusting actuators 34 to compensate for a variety of angular errors produced by external effects, such as component wear, thermal distortion, and forces acting against tool 14. Other controllers, known to those of ordinary skill in the art, could also be used.

Depending on the types of errors the machine tool alignment system 10 is designed to correct, controller 38 can be programmed with appropriate control algorithms to compensate the alignment errors as would be known to one of ordinary skill in the art. For example, controller 38 could be programmed to command actuators 34 based on previously measured machine alignment conditions for a given tool location, or with appropriate sensors (not shown), an in-process closed loop alignment system could be achieved. The present invention is not limited to any particular control algorithm, and controller 38 could be programmed with a variety of control algorithms depending on the desired error correction for a particular type of machine or usage of tool 14.

In the illustrated embodiment in which actuators 34 comprise diaphragm assemblies 36, at least one pressure reducing valve 40, such as the DRE4K, manufactured by Rexroth Corp., is connected in fluid communication with diaphragm assemblies 36. Preferably, one pressure reducing valve 40 is connected to each corresponding diaphragm assembly 36. Valves 40 are also connected to a valve driver 42, such as the MDSD1 valve driver, manufactured by Rexroth Corp. In the preferred embodiment, there are four actuators 34 connected to four corresponding valves 40, which, in turn, are each connected to a valve driver 42. Valve drivers 42 are controlled by controller 38.

Figure 2:
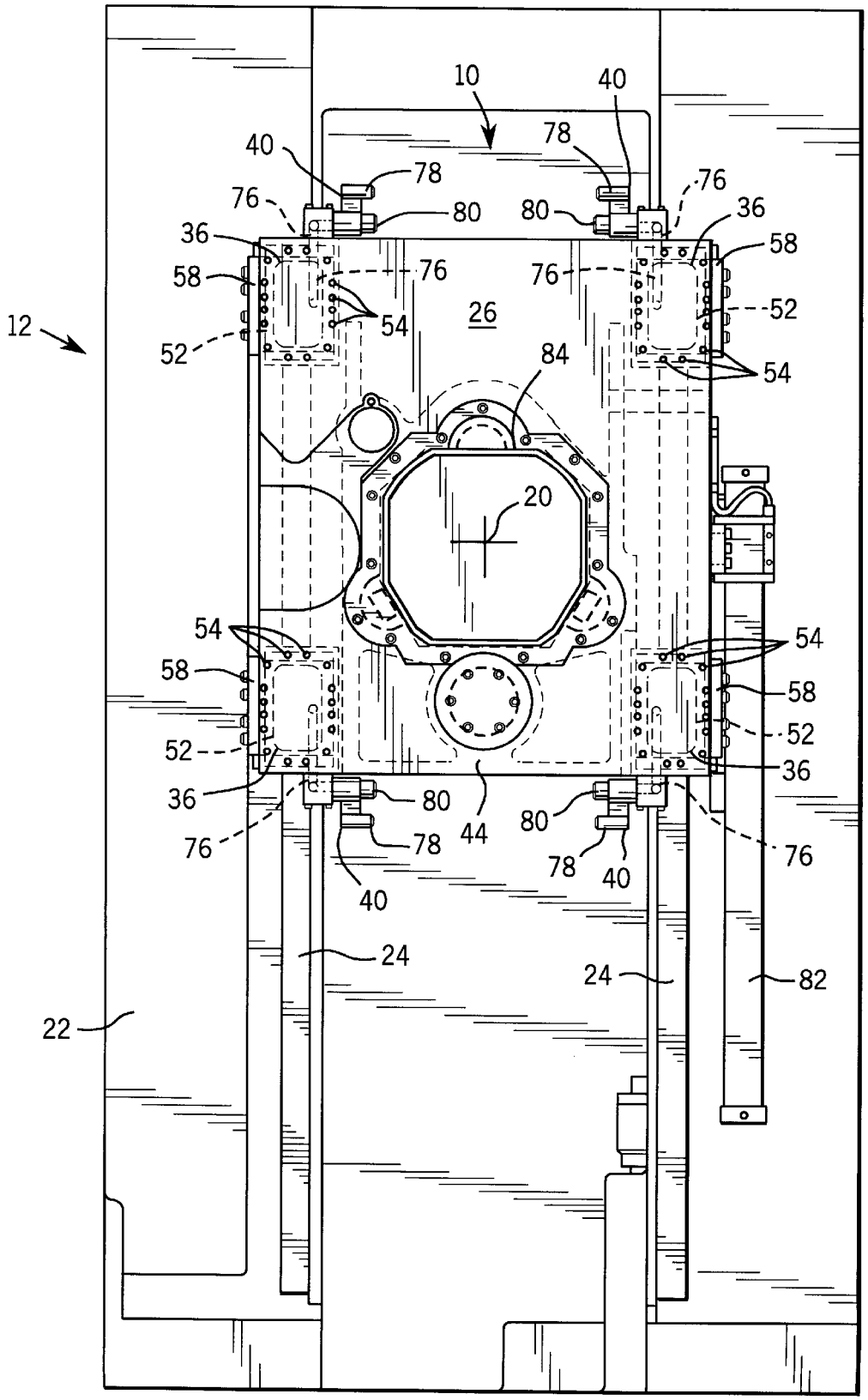
FIG. 2 is a detailed front view of a preferred embodiment of the machine alignment actuator system incorporating diaphragms according to one embodiment of the invention.
Figure 3:
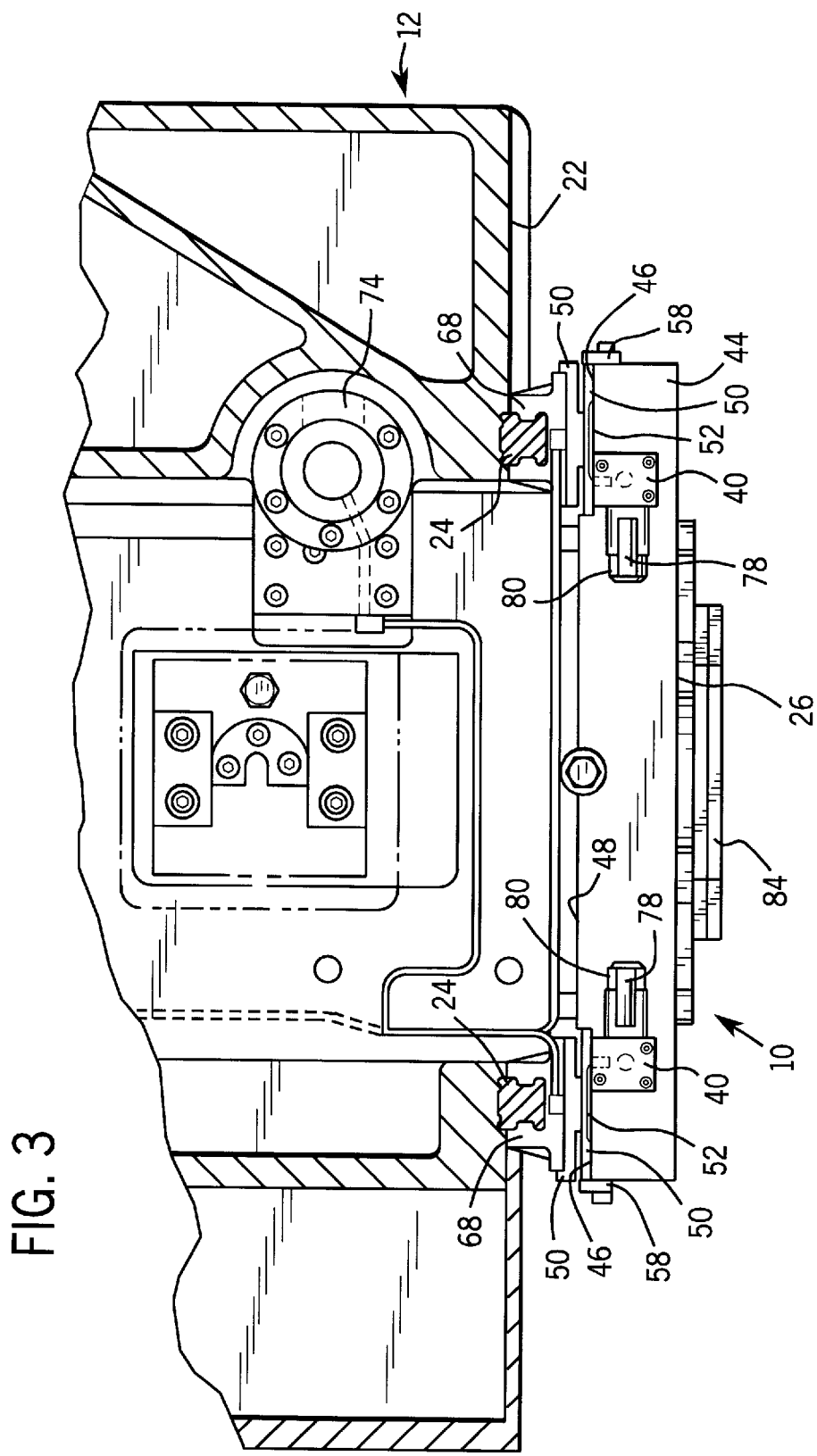
FIG. 3 is a partial cross-sectional top view of the embodiment illustrated in FIG. 2.
Figure 4:
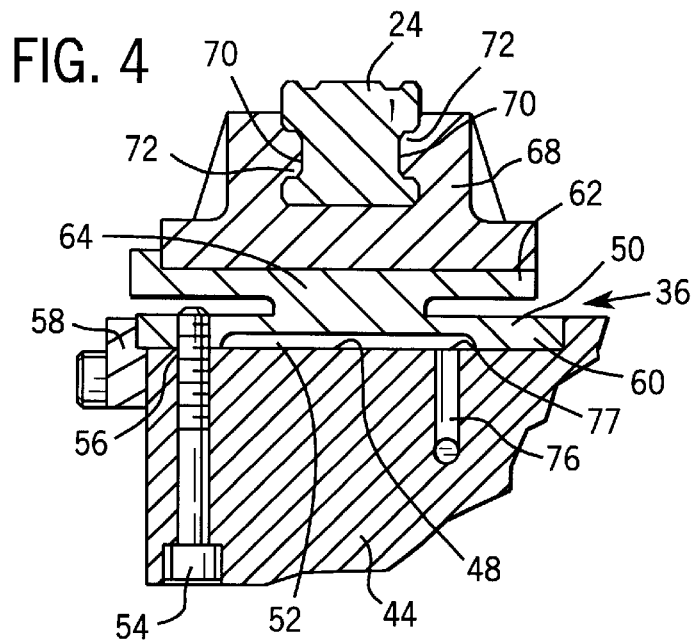
FIG. 4 is a partial cross-sectional top view showing one of the diaphragms connected to the machine slide assembly.

Referring generally to FIGS. 2–5, a specific embodiment of the invention incorporating diaphragm assemblies 36 is illustrated in greater detail. In this embodiment, support 30 comprises a plate 44 having recessed portions 46 in a back surface 48 (see FIGS. 3 and 4). Each diaphragm assembly 36 includes a diaphragm 50 having an internal cavity 52. Each diaphragm 50 is attached to back surface 48 within a corresponding recessed portion 46 to effectively enclose cavity 52 between back surface 48 and diaphragm 50 as illustrated in FIG. 4.

Figure 5:
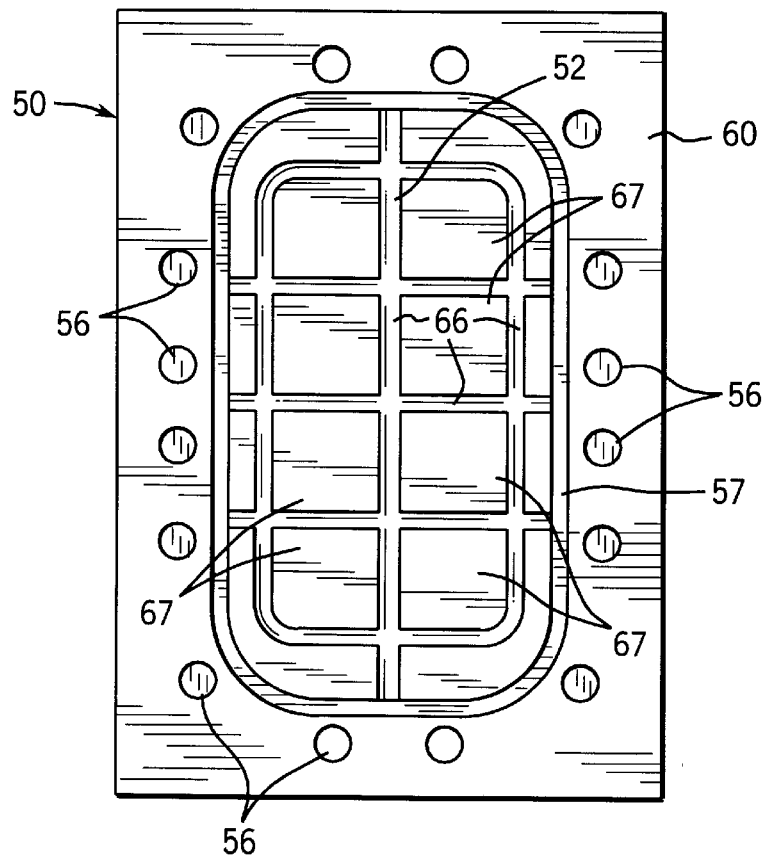
FIG. 5 is an internal view of a diaphragm used in conjunction with one embodiment of the invention.

Preferably, diaphragm 50 is attached to plate 44 by a plurality of fasteners 54, such as bolts, that extend through plate 44 and are threaded into corresponding threaded openings 56 of diaphragm 50. A seal (not shown), such as an elastomeric o-ring, is disposed between diaphragm 50 and back surface 48 to ensure an airtight seal of cavity 52 therebetween. As shown in FIG. 5, diaphragm 50 may include a groove 57 configured to retain the elastomeric o-ring in its proper position. Additionally, each diaphragm 50 may be further secured in place by a retainer plate 58 bolted to the sides of plate 44 as illustrated in FIGS. 3 and 4.

As illustrated best in FIGS. 4 and 5, the preferred form of diaphragm 50 includes a cavity plate 60, in which cavity 52 is formed, and an attachment plate 62 opposite cavity 52. Cavity plate 60 and attachment plate 62 are connected by a region of reduced cross sectional area 64. Cavity 52 comprises recessed channels 66 formed in cavity plate 60 and stops 67 disposed between channels 66 to abut back surface 48 and effectively stop any further compression of cavity 52 resulting from impact loading of machine slide assembly 26.

Attachment plate 62, on the other hand, is designed for rigid attachment to a way truck 68 that is slidably mounted to framework 22 and specifically to a corresponding way 24. Attachment plate 62 and way truck 68 are rigidly connected by an appropriate fastening mechanism, such as bolts or other fastening means.

Because diaphragms 50 are the links between way trucks 68 and headstock 30 (plate 44 in FIG. 4), they must be formed from a stiff material. Preferably, diaphragms 50 are made from a steel, such as 4140HR steel.

In the illustrated embodiment, there are two ways 24, each having a pair of grooves 70 formed in the sides thereof. Two way trucks 68 are slidably mounted on each way via a pair of flanges 72 that matingly engage grooves 70 as illustrated in FIG. 4. Thus, way trucks 68 and the attached machine slide assembly 26 may be moved along ways 24 by a mechanism 74, such as the ball screw drive illustrated in FIG. 3.

In the preferred embodiment, each valve 40 is mounted on plate 44 and communicates with its corresponding cavity 52 via a fluid passage 76 having an inlet orifice 77. Inlet orifice 77 may be fixed or adjustable to provide appropriate damping by restricting fluid flow therethrough when machine slide assembly 26 is placed under load. Valves 40 and diaphragm assemblies 36 could be designed for use with a variety of fluids, including liquids or gases, but are typically designed for use with pressurized oil. Each valve 40 includes a fluid inlet 78 and a fluid exit 80. Fluid inlets 78 are connected to a high pressure oil source (not shown) and the ingress and egress of fluid is controlled by controller 38 and valve drivers 42.

Appropriate measurement devices 82, such as linear encoders, may be used to measure the movement of machine slide assembly 26 along ways 24. It should also be noted that FIGS. 2 and 3 illustrate a tool holder mount 84, but do not actually show the tool holder 28.

Thus, support 30 of machine tool 12 may be selectively oriented to maintain proper alignment of tool 14 along a predetermined desired axis, such as axis 20. This alignment is accomplished by mounting actuator assembly 32 between framework 22 and machine slide assembly 26. The individual actuators 34 are disposed at unique locations between the framework and the support 30. Therefore, by selectively controlling the pressure, and therefore the extension, of individual actuators, (e.g., by flexing selected diaphragms 50) the machine slide assembly can be reoriented with respect to the framework 22. Consequently, tool 14 is properly reoriented with respect to desired axis 20 and/or workpiece 16. Preferably, four actuators are placed at four unique locations, but this number could be decreased or increased depending on the specific application.

It will be understood that the foregoing description is of a preferred exemplary embodiment of this invention, and this invention is not limited to the specific forms shown. For example, the system could be incorporated into a variety of machines, with or without ways, a variety of actuators could be used as long as the extension and contraction of each actuator may be independently controlled, a variety of control systems and control algorithms may be used with the invention, a variety of tools and tool holder assemblies may be used, and a variety of materials may be incorporated into the diaphragms. These and other modifications may be made in the design and arrangement of the elements without departing from the scope of the invention as expressed in the appended claims.

What is claimed is:

1. A machine alignment compensation system for aligning a tool head of a machine tool, the machine tool having a framework having at least one sliding way and a tool holder assembly slidably engaged on the sliding way, the tool holder configured to receive a tool for operation along a desired axis with respect to the framework, the machine alignment compensation system comprising:

at least three actuators disposed at separate locations and fixed between the sliding way and the tool holder assembly, each actuator including a flexible diaphragm for varying the distance between the sliding way and the tool holder assembly, wherein actuation of selected actuators pivots the tool holder assembly along at least two different alignment paths to realign the tool for operation along the desired axis.

2. The machine alignment compensation system as recited in claim 1, wherein the system includes at least four actuators.

3. The machine alignment compensation system as recited in claim 2, wherein each actuator includes a cavity bounded by the diaphragm, each diaphragm being sufficiently flexible to move the tool holder assembly away from the sliding way at its location when sufficient pressure is introduced into the cavity.

4. The machine alignment compensation system as recited in claim 3, further comprising a plurality of pressure reducing valves, each pressure reducing valve cooperating with at least one of the diaphragms to control the pressure of a fluid in the cavities.

5. The machine alignment compensation system as recited in claim 4, further comprising a control system operatively coupled to the plurality of pressure reducing valves to selectively control the ingress and egress of the fluid from the cavities, thereby permitting adjustment of the tool holder assembly alignment.

6. The machine alignment compensation system as recited in claim 5, wherein the control system comprises a computer numerical controller cooperating with a plurality of valve drivers.

7. The machine alignment compensation system as recited in claim 4, wherein there are four diaphragms and four pressure reducing valves, each pressure reducing valve cooperating with one of the four diaphragms.

8. The machine alignment compensation system as recited in claim 7, wherein each diaphragm includes a steel plate that flexes when sufficient pressure is introduced into the cavity.

9. A machine tool system of the type that moves a tool to perform an operation on a workpiece, the machine tool system being designed to maintain precise orientation of the tool with respect to the workpiece, the machine tool system comprising:

a framework;

a plurality of ways mounted to the framework;

a plurality of way trucks slidably engaged along the ways with a least one of the way trucks mounted on each way;

a machine slide assembly configured to orient the workpiece and tool with respect to each other; and an actuator assembly having a plurality of actuators, each actuator disposed between and rigidly attached to the machine slide assembly and at least one way truck, wherein each actuator includes a diaphragm assembly, each diaphragm assembly including an expandable diaphragm bounding a cavity for receiving pressurized fluid, wherein each actuator is independently expandable to adjust the distance between its corresponding way truck and the machine slide assembly to reorient the workpiece and tool with respect to each other.

10. The machine tool system as recited in claim 9, wherein each diaphragm includes a steel plate that flexes when sufficient pressure is introduced into its corresponding cavity.

11. The machine tool system as recited in claim 9, wherein the machine slide assembly includes a substantially flat plate, wherein the tool has a central longitudinal axis of operation and is rigidly attached to the flat plate such that the axis is substantially perpendicular to the plate, wherein the actuator assembly includes at least four actuators, each actuator disposed between and rigidly attached to the flat plate at a separate location spaced apart from the other actuators and the axis, and wherein each actuator diaphragm assembly expands in a direction substantially along the axis.

12. The machine tool system as recited in claim 10, further comprising:

a plurality of pressure reducing valves that cooperate with the cavities of the plurality of actuators; and a control system coupled to the pressure reducing valves to control the flow of a fluid through the valves.

13. The machine tool system as recited in claim 10, wherein each diaphragm assembly includes at least one stop to limit the compression of the cavity during an impact loading of the machine slide assembly.

14. The machine tool system as recited in claim 9, wherein the machine slide assembly is configured to receive the workpiece mounted thereon.

15. A machine tool comprising:

operating means for contacting and operating on a workpiece, the operating means having a preferred alignment orientation in three-dimensional space with respect to the workpiece;

first support means, fixed to the operating means, for supporting the operating means;

second support means for supporting the first support means and the workpiece; and mounting means, having at least a portion thereof disposed between and fixed to the first support means and the second support means and having a certain thickness therebetween, for at least partially mounting the first support means to the second support means and for adjusting the alignment orientation in at least two dimensions of three-dimensional space, the mounting means including bending means for varying the thickness of the portion of the mounting means by bending a solid member in response to a control signal.

16. The machine tool as recited in claim 15, wherein the mounting means is the only connecting structure between the first support means and the second support means.

17. The machine tool as recited in claim 15, wherein the portion of the mounting means disposed between the first support means and the second support means is configured to tilt the first support means with respect to the second support means in response to the control signal.

18. The machine tool as recited in claim 15, further comprising a control system which provides the control signal to the mounting means.

19. The machine tool as recited in claim 15, wherein the mounting means includes a plurality of individual actuators, each actuator disposed at a separate location with respect to the first support means.

20. The machine tool as recited in claim 19, wherein the plurality of actuators are each removably attached to the first support means and the second support means such that each may be individually replaced.

21. The machine tool as recited in claim 19, further comprising a computer controller for independently controlling the plurality of individual actuators, wherein the action of any one of the actuators is substantially independent of the action of any other actuator.

22. The machine tool as recited in claim 15, wherein the mounting means includes at least one diaphragm bounding a cavity, the diaphragm being sufficiently flexible to bend when sufficient pressure is introduced into the cavity.

23. The machine tool as recited in claim 22, wherein the diaphragm is a steel plate.

24. The machine tool as recited in claim 22, further comprising a pressure reducing valve cooperating with the diaphragm to control the pressure of a fluid in the cavity.

25. The machine tool as recited in claim 24, further comprising a control system operatively coupled to the pressure reducing valve to control the amount of fluid pressure in the cavity.

26. The machine tool as recited in claim 15, wherein the mounting means includes four diaphragms and four pressure reducing valves, each pressure reducing valve cooperating with one of the four diaphragms.

27. The machine tool as recited in claim 15, wherein the mounting means includes at least one piezo-electric actuator, the actuator being configured to tilt the first support means with respect to the second support means when sufficient voltage is applied to the actuator.

28. The machine tool as recited in claim 15, wherein the second support means includes sliding means for moving the first support means with respect to the second support means, and wherein the mounting means has at least a portion thereof disposed between and fixed to the first support means and the sliding means.

29. The machine tool as recited in claim 15, wherein the mounting means includes at least one means for limiting the compression of the bending means during an impact loading of the machine tool.

* * * * *